United States Patent [19]

Haynes

[11] Patent Number: 4,584,928
[45] Date of Patent: Apr. 29, 1986

[54] MOTOR MOUNT

[76] Inventor: Hendrick W. Haynes, P.O. Box 66152, Seattle, Wash. 98166

[21] Appl. No.: 378,534

[22] Filed: Apr. 27, 1982

Related U.S. Application Data

[63] Continuation-in-part of Ser. No. 163,872, Jun. 27, 1980, abandoned.

[51] Int. Cl.$^4$ ............................................. F01B 29/00
[52] U.S. Cl. ........................................ 92/161; 92/146; 123/195 R; 248/573; 248/603
[58] Field of Search .................. 92/161, 146, 147, 148, 92/149, 150; 123/195 R; 248/573, 574, 603, 605, 632, 634

[56]  References Cited

U.S. PATENT DOCUMENTS

| | | | |
|---|---|---|---|
| 2,141,648 | 12/1938 | Geyer | 248/205 |
| 2,198,672 | 4/1940 | Lee | 248/603 |
| 2,838,262 | 6/1958 | Anderson | 248/603 |
| 2,919,882 | 1/1960 | Barkalow | 248/573 |
| 3,430,901 | 3/1969 | Couvin | 248/632 |
| 4,258,896 | 3/1981 | Kato et al. | 248/573 |
| 4,401,167 | 8/1983 | Sekizawa et al. | 248/573 |

Primary Examiner—Paul E. Maslousky

[57] ABSTRACT

A motor mount having first and second mounting surfaces with at least three mounting elements fixed therebetween is used to absorb motor vibration and shock impulses which are produced primarily parallel with the plane of the mounting surfaces. Two of the three mounting elements are dampers which flexibly connect the first mounting surface in a parallel relation with the second mounting surface. The third mounting element maintains a preferred range of distance separation between the mounting surfaces to that a damping flexion potential of the dampers is maintained.

8 Claims, 10 Drawing Figures

MOTOR MOUNT

CROSS REFERENCE TO RELATED APPLICATION

This application is a continuation-in-part of my application Ser. No. 163,872 filed June 27, 1980 and entitled "Motor Mount" now abandoned.

BACKGROUND OF THE INVENTION

1. Field of the Invention

This invention is in the field of motor mounts and more particularly a motor mount which effectively dampens motor vibration produced primarily as a shear moment relative the separate motor mounting elements.

2. Prior Art

Lea—U.S. Pat. No. 401,179
Summers—U.S. Pat. No. 1,694,758

Copies of the above patents were furnished to the applicant by the examiner in the course of the prosecution of the above mentioned parent application.

Other References

[1] Adler, U. and Bazlen W., *Automotive Handbook*. Stuttgart: Robert Bosch, 1976., 72-75. Copies of the pertinent portions of the above reference are enclosed. This reference gives a concise summary of vibration.
[2] Jones, Franklin D. and Oberg, Erik. *Machinery's Handbook*. 19th Ed. New York, Industrial Press Inc., 1974., 152.

Mounts for internal combustion engines have been developed largely for the purposes of supporting and absorbing vibration from the automobile engine. As automobiles have developed, the engine mounts for them have been concurrently developed. There are presently available a wide variety of engine supporting and vibration-absorbing mounts. Unfortunately, these automobile engine mounts are directed almost entirely toward supporting an engine in a plane substantially parallel with the engines longitudinal axis or the inertia-line of the pistons and hence substantially perpendicular to the torque impulse. With conventional lawn mowers or some aircraft engines, there is either little need for reducing the transmission of vibration to a supporting structure or there is a balancing of piston torque impulses as with an engine having a plurality of opposed radially aligned pistons.

In the mounting of an engine-jet pump combination in a boat with engine crank and drive shaft axis substantially perpendicular to the plane of a subjacent mount and support structure, it has been found that the piston torque impulse acting parallel to the mount surface and acting upon the separate mounting elements in shear will quickly destroy or render useless the engine mounts of the prior art. The prior art is therefore lacking in this specific application wherein the piston torque impulse is parallel to the plane of the mounting surface.

One prior patent, Summers et al., U.S. Pat. No. 1,694,758, has elements which will dampen ocillations and vibration only in compression or that is, in a direction substantially perpendicular to piston torque impulse. As given on lines 76 through 77 of page 1 of the Summers patent, the only structure which allows this mount to accomodate for shear moments is a "stud slightly smaller than the hole in the arm".

In addition, the structure 7 in the drawings for Summers appears at first glance to be an element in itself but is in fact a structure which only increases the stiffness of the rubber ring 6 and is an integral part of the ring 6. As given on lines 99–105 of page 1, the structure 7 of Summers only "limits the elasticity of the rubber". Also, "the displacement of the rubber is limited and after it fills the narrow annular space between the ends of the cups it can go no further . . . "

The Summer's patent then has one supportive and vibration-absorbtive element 4 and a second element arguable consisting of 6, 7 and 10. In addition, the Summer's patent accomodates shear by making the stud 10 of loose fit. This type of shear accomodation is inadequate when it is desired to dampen vibrations arising from consistent piston torque impulses acting in shear with respect to the separate mounting elements.

Lea, U.S. Pat. No. 401,179 teaches the interchangeability of the coil spring and rubber mount for the damping of shock and vibration. However, this art does not disclose that the coil spring which experiences shear moments is relatively unpredictable and therefore unsuitable when the primary impulses to be damped are created in a direction perpendicular to the longitudional axis of the coil spring.

OBJECTS AND ADVANTAGES

It is an object of this invention to provide a motor mount capable of damping motor vibration produced primarily as a shear moment relative the separate mounting elements.

It is an object of this invention to provide a motor mount capable of effectively damping vibration and shock from an engine whose driveshaft is perpendicularly aligned with respect to the motor mount.

It is an object of this invention to provide a motor mount capable of effectively damping the low-frequency impulses produced by a single or twin cylinder engine whose direction of piston travel is substantially perpendicular to driveshaft output torque and whose driveshaft is perpendicularly aligned with respect to motor mount.

It is a further object of this invention to provide a motor mount capable of damping resonant vibrations arising within the mount itself.

SUMMARY OF THE INVENTION

What is provided is an engine mount having first and second mounting surfaces with at least a triad of separate mounting elements positioned therebetween to dampen and thereby reduce engine vibration and resonant vibration associated therewith passed through from the first mounting surface to the second mounting surface. The engine itself is fixed to or a part of the first mounting surface and the second mounting surface is fixed to or a part of an appropriate support structure. Two of the three mounting elements are first and second damping means which flexibly connect the first mounting surface in a substantially parallel relation with the second mounting surface. These first and second damping means have respective first and second separate resonant frequency ranges, so that the resonance vibration of the first damping means will be damped by the second damping means and vice versa. The third element is a thrust bearing means fixed between the first mounting surface and the second mounting surface for maintaining a range of distance separation between the first and second mounting surfaces which is most ideal for the damping flexion of the first and second damping means.

In the case where a conventional combustion engine of, for instance, one or two cylinders, is fixed with it's driveshaft perpendicular to the plane of the mounting surfaces the vibration and shock caused by piston torque impulse will be produced in a direction primarily parallel to the mounting surfaces. As the first mounting surface, being attached or formed of the motor or motor casing, is translated relative the second mounting surface or rotated about the axis of the engine driveshaft relative the second mounting surface, the separate mounting elements which join the first and second mounting surfaces will be acted upon in shear. The first and second damping means will thus flex and damp in shear. The thrust bearing means will maintain the preferred range of distance separation between the first and second mounting surfaces.

The thrust bearing means may be a cylinder or block of some non-deformable material which is fixed to one of the respective mounting surfaces and located a distance from the other mounting surface such that relative translation of the first mounting surface toward the second mounting surface is limited to within that range which permits the most ideal damping flexion of the first and second damping means.

Alternatively, the thrust bearing means may be a conrad or tapered roller bearing centrally located between the mounting surfaces. The tolerances within these bearings are such that relative translation of the first and second mounting surfaces is allowed only within the range of distance separation of the first and second mounting surfaces which maximizes the damping potential of the flexion of the first and second damping means.

DETAILED DESCRIPTION

Figure 1:
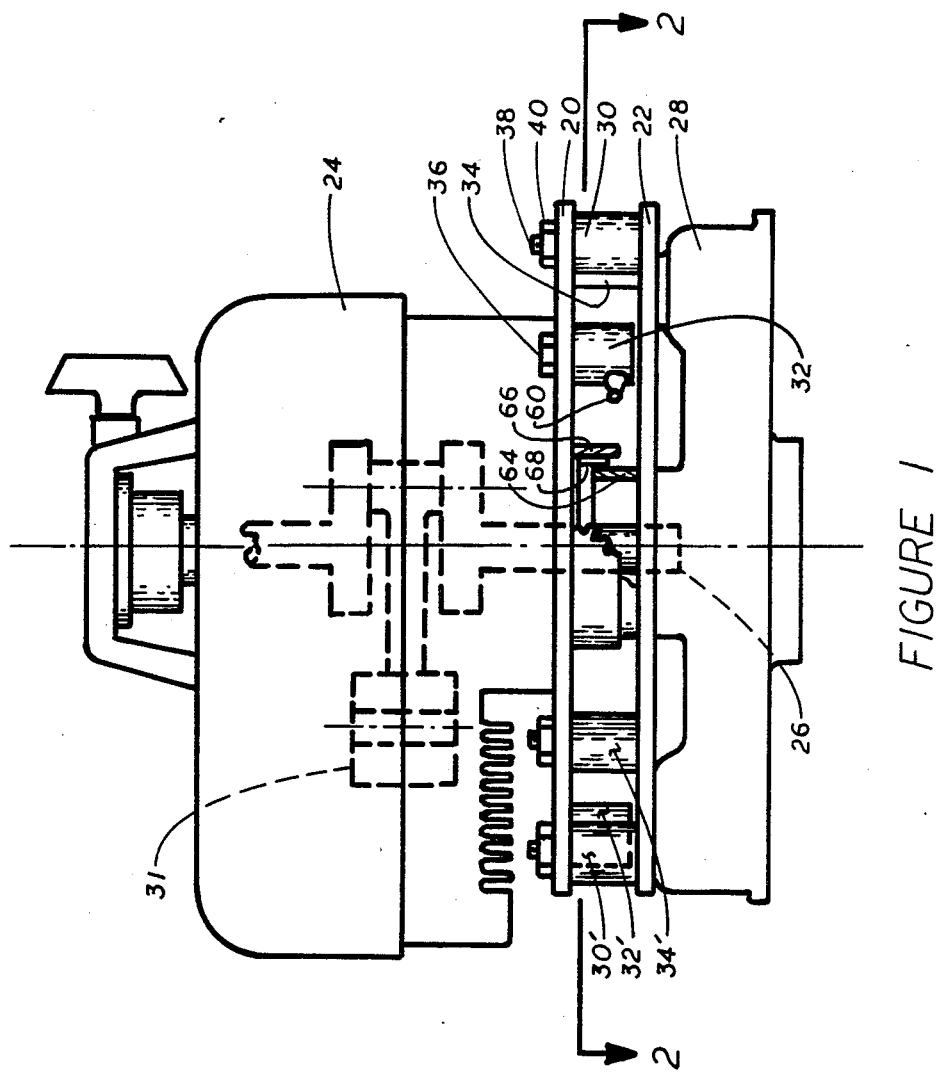
FIG. 1 is a side view of one embodiment of the motor mount of this invention with an internal combustion engine mounted atop the motor mount and a pump mounted below the motor mount.
Figure 2:
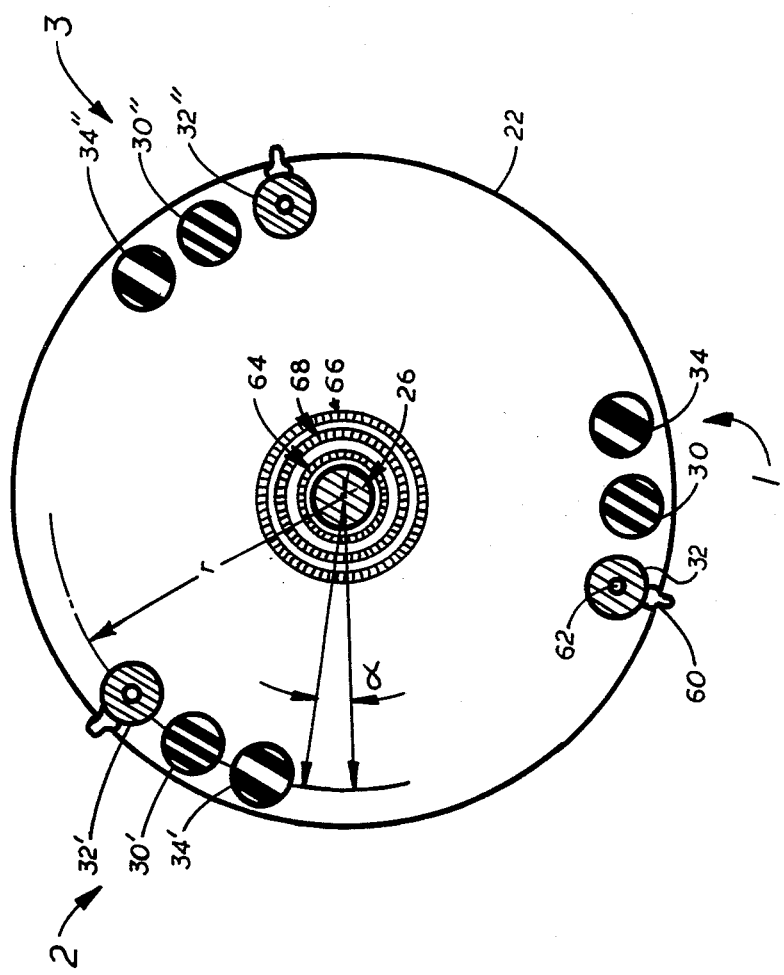
FIG. 2 is a sectional plan view along the lines 2—2 of FIG. 1 showing the symmetrical arrangement of the mounting elements.
Figure 3:
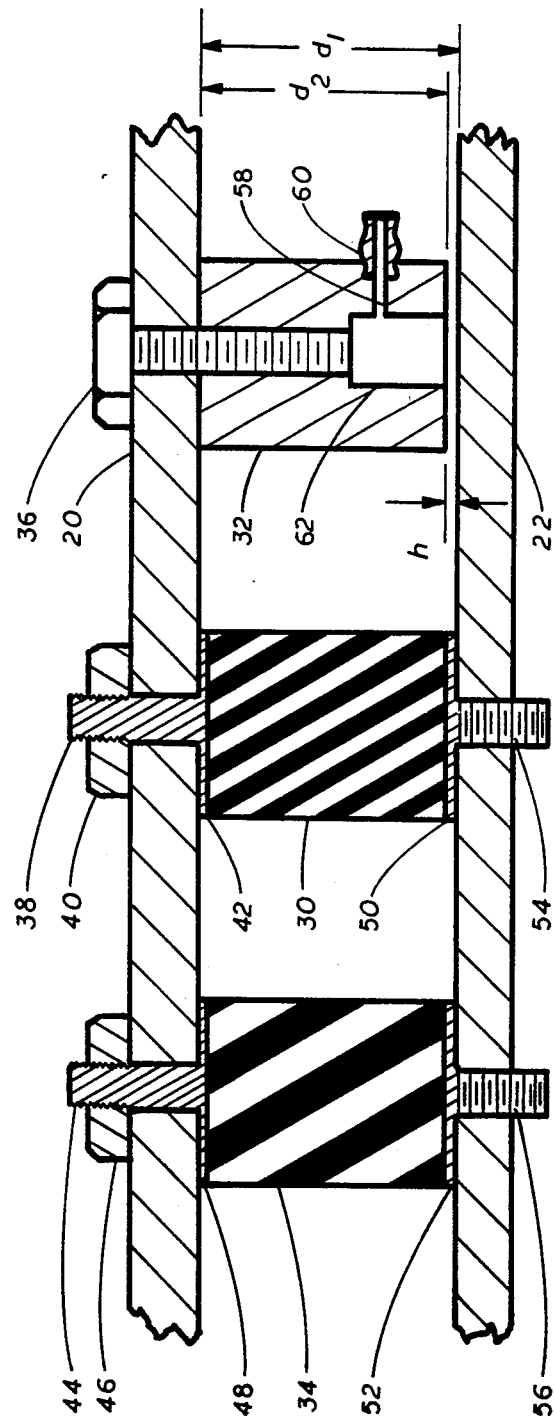
FIG. 3 is an enlarged side sectional view of the mounting elements as shown in FIGS. 1 and 2.

A preferred embodiment of the invention as applied to mounting an engine upon a pump is shown in FIGS. 1 and 2 wherein a plurality of separate mounting element groups 1, 2 and 3 are shown symmetrically arranged between the mounting surfaces 20 and 22. Though this preferred embodiment of FIGS. 1 and 2 shows 3 groups of mounting elements, the simplest embodiment of the invention is shown in the sectional FIG. 3. This FIG. 3 shows a single group or triad of elements separating the mounting surfaces 20 and 22 and it is the single group or triad of elements of which this invention most basically consists.

FIGS. 1 and 2 show three separate groups of mounting elements 1, 2 and 3 flexibly connecting a first mounting surface 20 to a second mounting surface 22 in a substantially parallel relation. The first and second mounting surfaces, 20 and 22 respectively, are flat circular plates approximately equal in diameter and having contained therein sufficient aperatures and means for the attachment of the structures adjacent the mount as described below.

Figure 6:
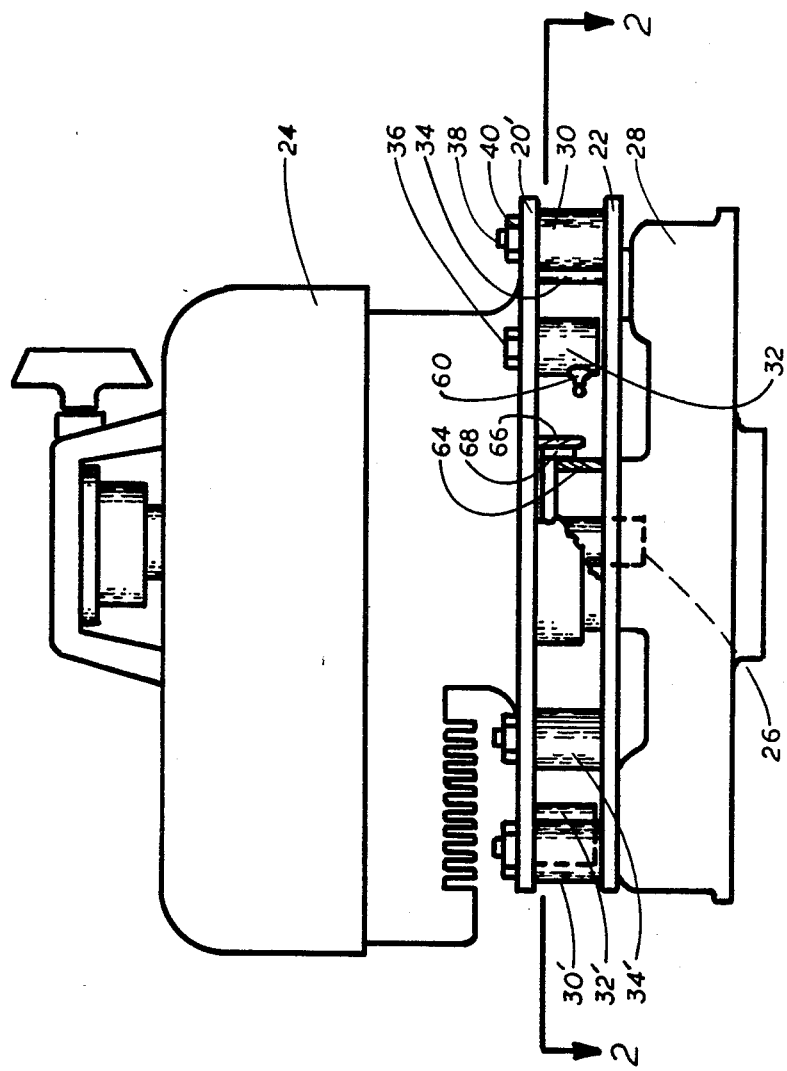
FIG. 6 is a side view of the motor mount of this invention wherein the first mounting surface is integral with the motor.
Figure 7:
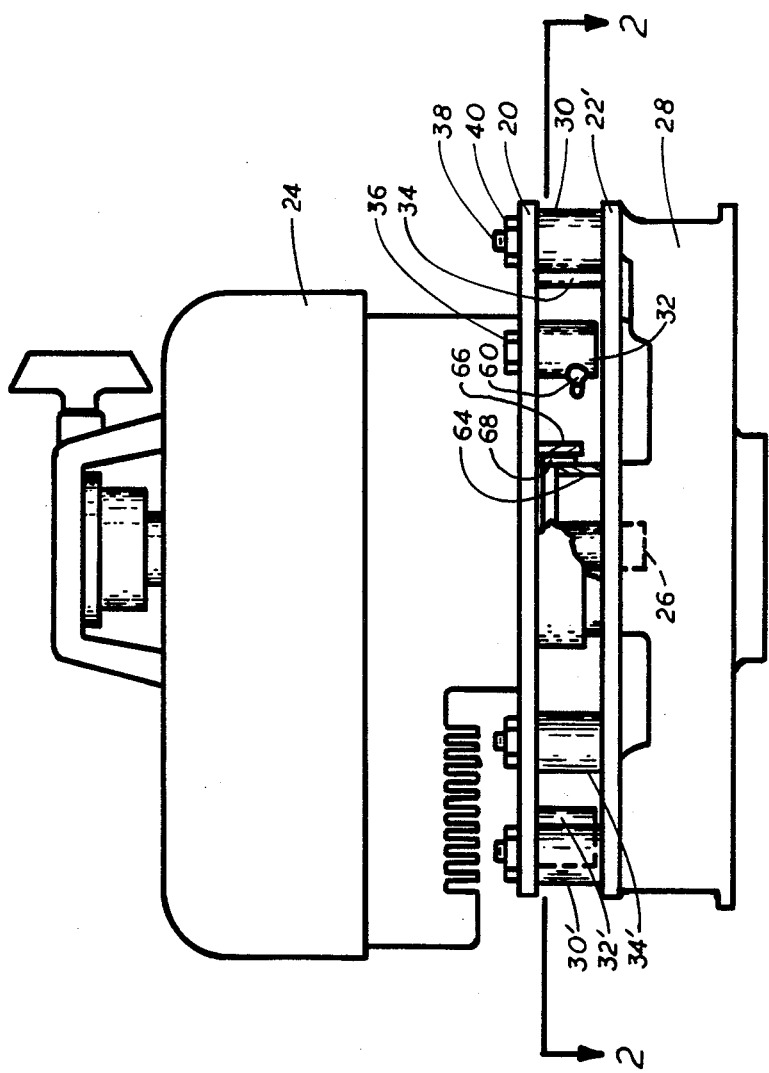
FIG. 7 is a side view of the motor mount of this invention wherein the second mounting surface is integral with it's support structure.

The first mounting surface may be integral with the motor as shown in FIG. 6, wherein the flange 20' forms the first mounting surface. The second mounting surface may be integral with the support structure or pump 28 and may comprise the flange 22' as shown in FIG. 7.

Fixed atop the first mounting surface 20 is a one cylinder internal combustion engine 24. The engine 24 could have several or many cylinders but for this first embodiment, the engine 24 is said to have but one piston 31 as shown in FIG. 1. Fixed beneath the second mounting surface 22 is a pump 28. The pump 28 is drivingly connected to the engine 24 by means of the drive shaft 26. Extending upwardly from the pump 28 is a pump hub 64 and depending from the first mounting surface is a flange 66. The bearing 68, such as a radial needle bearing, located between the flange 66 and pump hub 64 accomodates a rotational and translational movement of the engine 24, first mounting surface 20 and flange 66 with respect to the pump 28, second mounting surface 22 and pump hub 64.

In this specific mount embodiment, the one cylinder engine 24 is the source of vibration and shock impulses. As with most other conventional internal combustion engines, the single piston 31 of engine 24 has a direction of reaction travel with respect to output torque which is substantially perpendicular to its driveshaft 26. Given the arrangement of this embodiment, the direction of piston 31 travel will be substantially parallel with the first and second mounting surfaces 20 and 22 respectively. The pump 28 and any subsequent support for the pump 28 comprise the appropriate support structure. It is desired to shield the engine-produced vibration and shock impulses from the support structure.

The piston 31 impulse created in firing the cylinder of engine 24 will primarily act to torque or rotate the engine 24 about the axis of the crankshaft 26. This defines a plane of rotation or a torque plane about which engine 24 acts as a result of the action of piston 31. The consequent vibration and shock is not purely rotational about the driveshaft 26 and it is not just translational and rotational but is sufficiently both to negate the usefulness of the prior art. The separate mounting elements of the three groups of mounting elements 1, 2 and 3 act to uniquely dampen the piston 31 torque impulse so that the mounting of a conventional internal combustion engine with its driveshaft perpendicular to a mounting structure, in this case pump 28, is made feasible.

Each of the mounting element groups 1, 2 and 3 have a first damping means 30, 30' and 30" respectively. The first damping means 30, 30' and 30" are capable of damping vibrations in shear, that is, as the first mounting surface translates relative the second mounting surface 22. These first damping means 30, 30' and 30" are sandwich mountings of an elastomeric material such as those manufactured by Lord Kinematics Inc., 2730 West 12th Street, Erie, PA 16512. The elastomeric material for each first damping means, such as that of first damping means 30 sectioned in FIG. 3, is fixed to end plates 42 and 50. The end plates 42 and 50 are in turn fixed to respective threaded ends 38 and 54 and the threaded ends 38 and 54 are turned into threaded aperatures in the first and second mounting surfaces 20 and 22. The entire arrangement is secured by tightening nut 40 upon the threaded end 38 so that the first and second mounting surfaces 20 and 22 are securely yet flexibly connected. It is anticipated that there are other suitable means for attaching both the first damping means 30 and the below mentioned elements to the first and second mounting surfaces 20 and 22.

The second damping means 34, 34' and 34" of groups 1, 2 and 3 respectively are also sandwich mountings of an elastomeric material such as those manufactured by Lord Kinematics. The elastomeric material of each second damping means, such as that of the second damping means 34, sectioned in FIG. 3, is fixed to end plates 48 and 52. The end plates 48 and 52 are in turn fixed to respective threaded ends 44 and 56 and the threaded ends 44 and 56 are turned into threaded aperatures in the first and second mounting surfaces 20 and 22. The entire arrangement is secured by a tightening nut 46 upon the threaded end 44 so that the first and second mounting surfaces 20 and 22 are securely yet flexibly connected.

The first damping means 30, 30' and 30" and the second damping means 34, 34' and 34" are capable of damping shock and vibration in shear, that is, as the first mounting surface 20 translates relative the second mounting surface 22. In addition, the first damping means 30, 30' and 30" have a natural resonant frequency range which is outside the natural resonant frequency range of the second damping means 34, 34' and 34". This is so that the resonance vibration of the first damping means 30, 30' and 30" will be damped by the second damping means 34, 34' and 34" and vice versa.

The thrust bearing, or, in the case of this embodiment, the bearing blocks 32, 32' and 32" complete the triad of elements which comprise this invention. The bearing block 32 is a cylinder of some non-deformable material which is fixed to the first mounting surface 20 by means of bolt 36. The bearing block 32 extends to within a preferred damping separation distance h of the second mounting surface 22. The distance h is also the preferred or ideal range of distance separation between the first mounting surface 20 and the second mounting surface 22. As the first and second damping means 30 and 34 are flexed in shear by the rotation and translation of the respective first and second mounting surfaces 20 and 22 about the axis of crankshaft 26, the distance between the first and second mounting surfaces 20 and 22 will decrease by an amount equal to the damping separation distance h. The bearing block 32 will abut and slide on the second mounting surface 22 to limit the flexion of the first and second damping means 30 and 34. The damping separation distance h can be also described as a running fit between the bossing and bearing means 32 and the second mounting surface 22 and this distance h has been found to be ideally 0.001 to 0.005 inches. The distance h or damping separation of the bearing block 32 from the second mounting surface 22 will be regained by the triad of elements as the first and second damping means 30 and 34 return from flexion. The secondary component of shock and vibration which acts in a direction perpendicular to the mounting surfaces 20 and 22 will be largely absorbed by the abutting and sliding of the bearing block 32 on the second mounting surface 22. Lubricant in cavity 62 provides the lubricating means for the bearing surface between the bearing block 32 and the second mounting surface 22. A grease fitting 60 communicates with the lubricant cavity 62 so that the lubricant cavity 62 can be periodically replenished.

Though the embodiments of FIGS. 1 and 2 disclose several groups of mounting elements, it is anticipated that the most basic embodiment of this invention is the simple triad of elements shown in FIG. 3. This triad of elements comprising the bearing block 32 and the first and second damping means 30 and 34 is uniquely capable of damping impulses produced parallel to the mounting surfaces and though the invention finds particular applicability with the motor mount embodiment as disclosed, the stucture and function of the invention are such that further applications of the invention will be apparent to one trained in the art.

Figure 4:
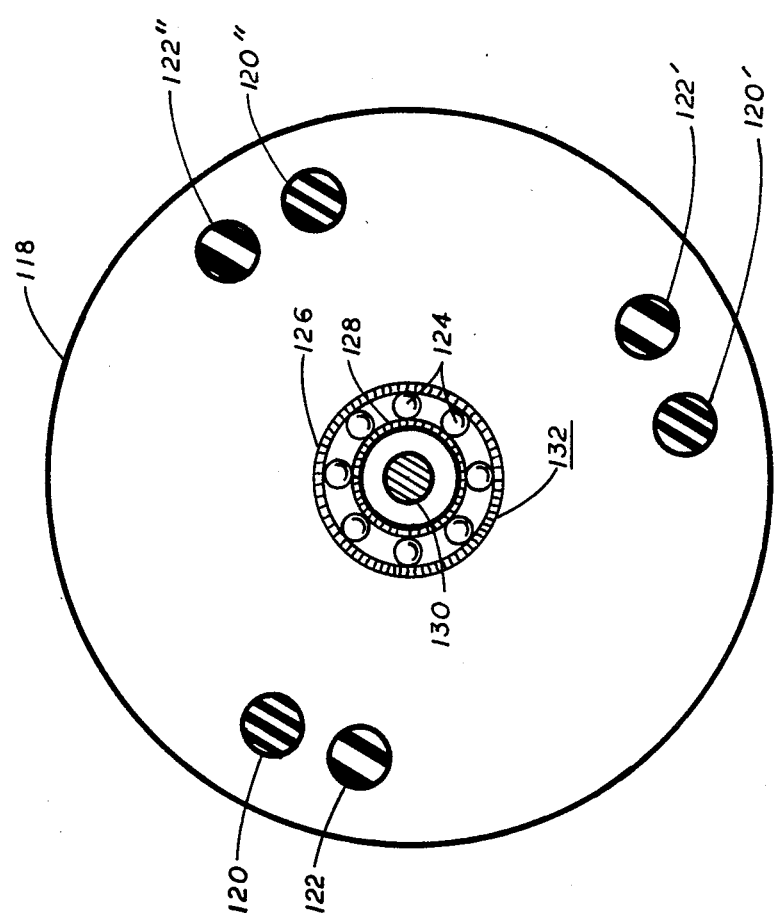
FIG. 4 is a sectional plan view of the motor mount showing the second mounting surface and an alternate embodiment of the thrust bearing means.
Figure 8:
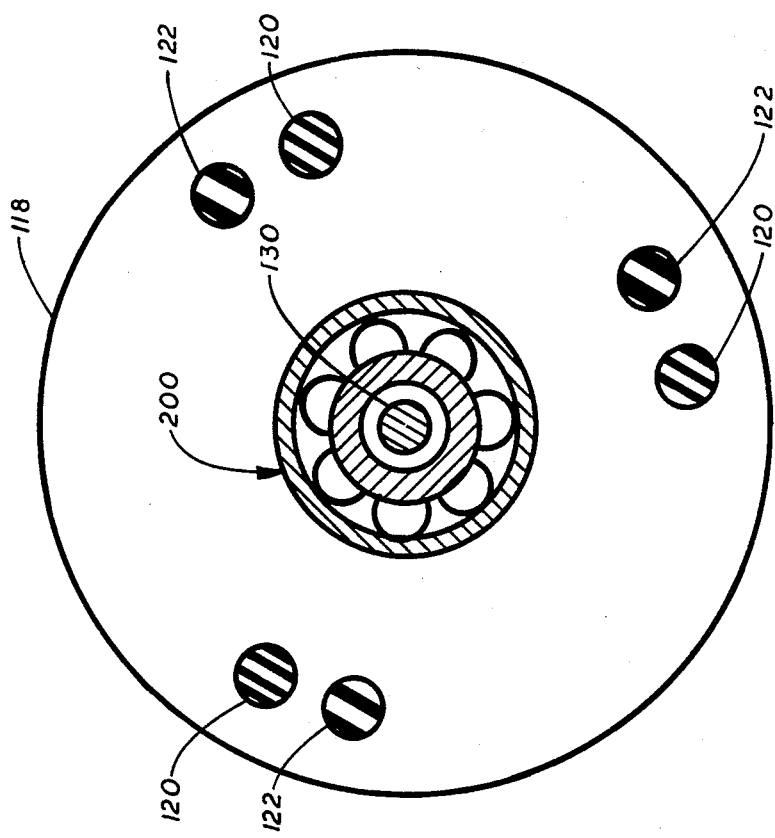
FIG. 8 is an embodiment showing the tapered roller bearing embodiment of the thrust bearing means of this invention.
Figure 9:
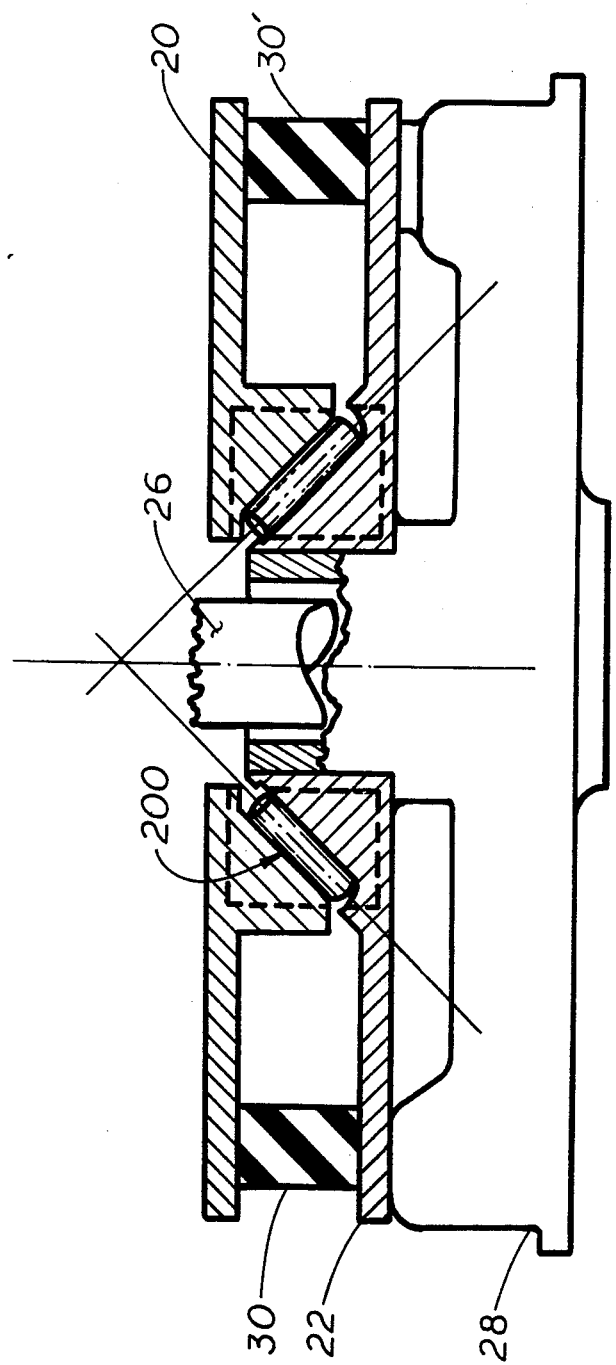
FIG. 9 is a cross sectional view of a thrust bearing arrangement using the tapered roller bearing of FIG. 8, wherein a single tapered roller bearing is employed as is commonly found in the art once the principles of the invention are understood.
Figure 10:
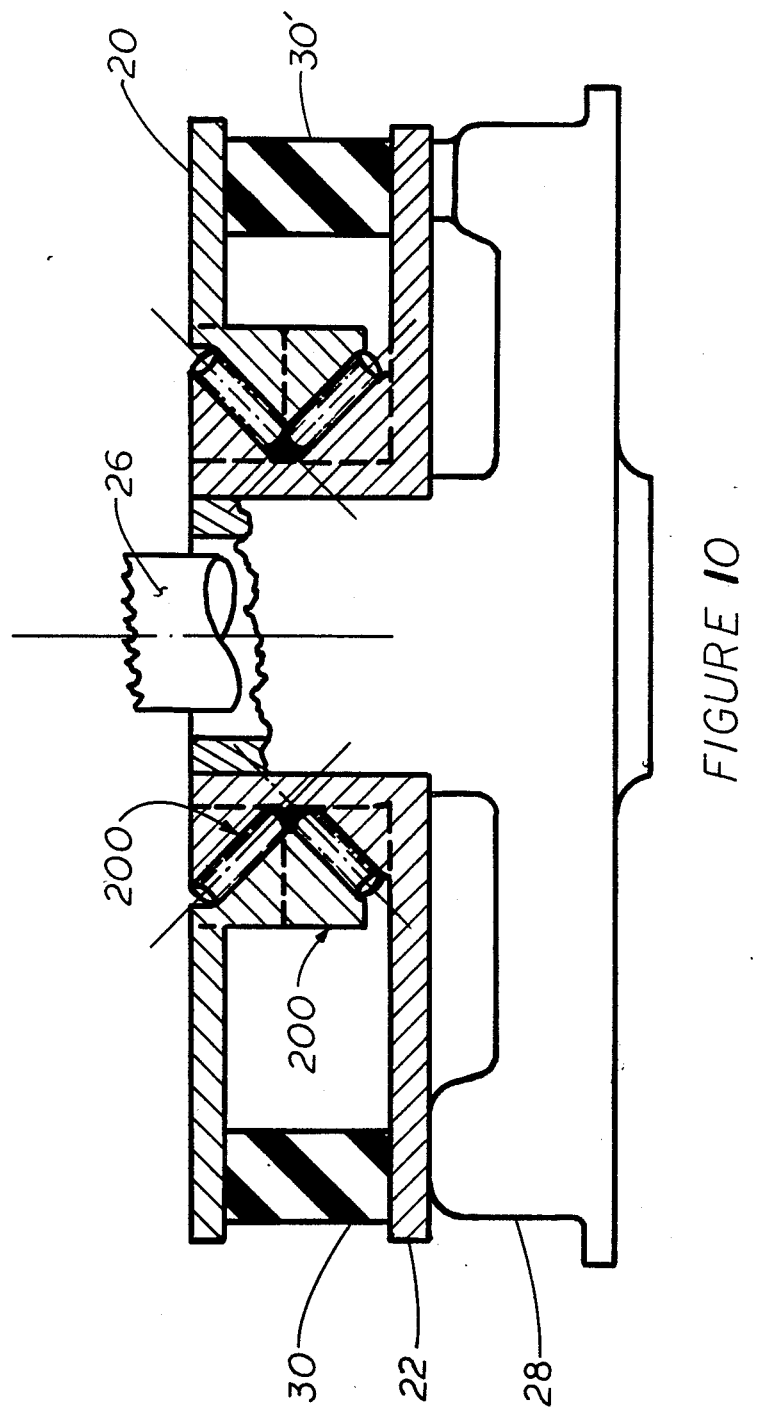
FIG. 10 is a cross sectional view of a duplex thrust bearing arrangement using the tapered roller bearing of FIG. 8, wherein two tapered roller bearings are employed as is commonly found in the art, once the principles of the invention with reference to the criticality of the prefered range of distance between first and mounting surfaces is understood.

Shown in the sectional plan view of FIG. 4 is an additional embodiment using ball bearings 124 as a thrust bearing means. In this embodiment a plurality of ball bearings 124 are positioned between a grooved inner diameter raceway 128 and a grooved outer diameter raceway 126 to form a conrad or deep groove bearing as is well known in the art. The first damping means 120, 120' and 120" and second damping means 122, 122' and 122" are positioned symmetrically upon the second mounting surface 118. The inner raceway 128 is fixed to one of the respective first and second mounting surfaces and the outer raceway is fixed to the other of the respective first and second mounting surfaces. In this embodiment, an engine is positioned with a driveshaft 130 perpendicular to the plane of the second mounting surface 118. The rotational and translational components of the vibration and shock transmitted from the engine will act to rotate the first mounting surface relative the second mounting surface and about the axis of the driveshaft 130. As the plurality of the first damping means 120, 120' and 120" and second damping means 122, 122' and 122" flex in shear to damp this relative rotation, the first mounting surface will also translate toward the second mounting surface 118. In this embodiment, a damping distance separation is provided by the distance between the balls 124 and the raceways 126 and 128 in bearing 132. That is, the equivalent in FIG. 5 of the distance h in FIG. 3 is the distance between the balls 124 in bearing 132 and the raceways 126 and 128 (e.g., "clearance" or "running tolerance") in bearing 132. The travel of the ball bearings 124 within the raceways 126 and 128 will accomodate the relative rotation of the mounting surfaces and the gaps between the ball bearings 124 and the raceways 126 and 128 will allow the flexion through the range of damping distance separation. In FIGS. 8, 9 and 10, tapered roller bearings 200 may be used instead of a ball bearing 132 as a thrust bearing means wherein the rolling elements in bearing 200 behave as the rolling balls 124 in the grooved raceway in bearing 132. Thus an embodiment is provided which allows support of the first mounting surface from a central position, which permits the use of an easily obtainable thrust bearing means and which provides the needed distance separation for proper damping flexion of the first and second damping means. When it is desired, tapered roller bearings 200 can serve in place of the conrad bearing. This embodiment of the thrust bearing means is shown generally as tapered roller bearing 200 in FIG. 8.

Figure 5:
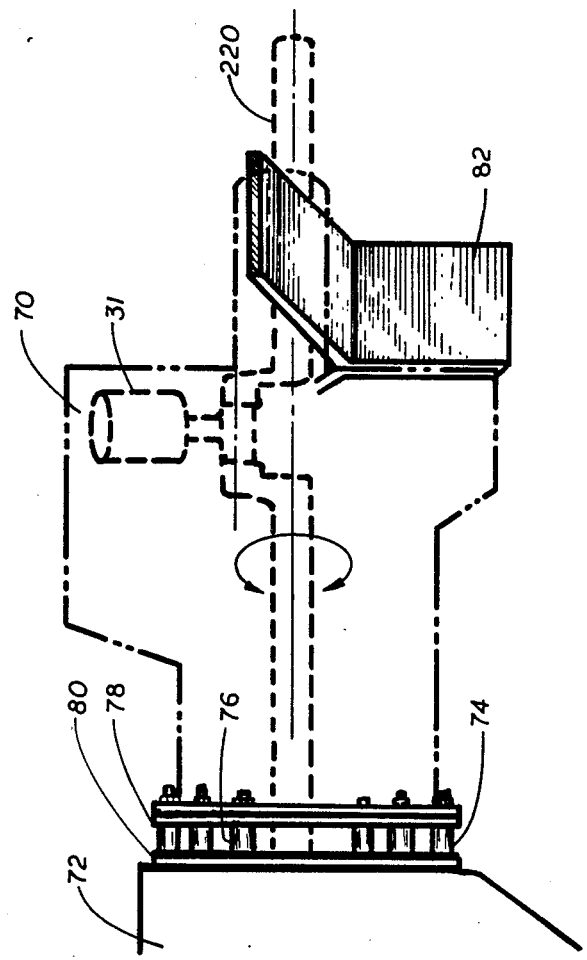
FIG. 5 is a side view of an alternate method of utilizing the motor mount of this invention.

FIG. 5 shows an alternate method for utilizing the motor mount of this invention. The first and second mounting surfaces 78 and 80 are shown fixed respectively to the engine 70 and an adjacent support structure 72. A support 82 accompanies the element mounting groups 74 and 76 in support of the engine 70. As with the foregoing embodiments, the engine 70 has a driveshaft 220 substantially perpendicular with the plane of the first and second mounting surfaces 78 and 80 and has a piston 31 impulse which is substantially parallel with the plane of the mounting surfaces.

A better understanding of the motor mount of this invention can be obtained with reference to the formula below and FIGS. 2 and 3.

$$d_1 - d_2 = h$$
$$h = r[1 - \cos(\alpha/2)]$$

$$\cos \alpha = 4\left(\frac{h^2}{r^2} - \frac{2h}{r}\right)$$

$$\alpha = \left[\left[\frac{K_s dx}{I_m dt}\right]^{-1} \pi/2r\right] 360°$$

$$\frac{\alpha}{\text{LOAD}} = \left[\left[\frac{K_{sf}}{I_{mf} dt}\right]^{-1} /\pi 2r\right] 360° - \frac{k s_i}{I_{mi} dt} - 1/\pi 2r \, 360°$$

where:
$d_1$ = pre-flexion or undamped separation of the first and second mounting surfaces 20 and 22.
$d_2$ = thickness of the bearing block 32
h = damping separation distance or range of distance separation of the mounting surfaces permitted before transition
r = radius of the symmetrical mount circle
$\alpha$ = angle through which the mounts are translated or rotated about the axis of the driveshaft
$K_s$ = displacement "constant" or shear of the first and second damping means 30 and 34 combined (non-linear function data empirically developed)
$I_m$ = torque impulse produced by engine 24 Subscripts:
f = final, e.g., end point of analysis
i = initial, e.g., beginning point of analysis
LOAD = impulse by engine 24

Although specific embodiments of the invention are herein described there are additional embodiments which might, for instance, change the arrangement of the mounting elements and which embodiments, though not herein specifically disclosed, are yet covered by the nature and scope of the invention, and wherein the specific embodiments disclosed herein become understood by those normally skilled in the art, may be incorporated therefrom.

I claim:

1. An engine mount for use in damping the transmission of engine vibration between an engine means (24) and an appropriate support structure (28, 72), said engine mount comprising;
   a first mounting surface (20, 78) fixed to said engine means (24);
   a second mounting surface (22, 80, 118) fixed to said appropriate support structure (28, 72) in a substantially parallel relation with said first mounting surface;
   at least one thrust bearing means (32, 76, 132, 200) for maintaining a prefered range of separation distance 'h' between said first and second mounting surfaces;
   a damping means including at least a first (30, 30', 30'') and second (34, 34', 34'') damping means having different resonant frequencies flexibly connecting said first mounting surface to said second mounting surface for reducing the transmission of vibration associated therewith from said first mounting surface to said second mounting surface;
   wherein vibration and shock from said engine means (24) causes said first mounting surface to rotate and translate about an axis of said engine means relative to said second mounting surface, and said thrust bearing means (32, 76, 132, 200) provides for limited rotational and translational movement of said engine means over a prefered range of damping separation (distance 'h') between said first and second mounting surfaces, resulting in the limitation of the damping flexion potential of said damping means.

2. The engine mount of claim 1 wherein said thrust bearing means comprises a bearing block (32, 124, 200) of non-deformable material fixed to one of said first and second mounting surfaces and located a distance from the other of said first and second mounting surfaces such that translation of said first mounting surface toward said second mounting surface causes said bearing block to abut and slide between said first and second mounting surfaces so that said prefered damping separation distance will decrease by an amount equal to the damping separation distance 'h'.

3. The engine mount of claim 2 wherein said first mounting surface is integral with said engine means (24).

4. The engine mount of claim 2 wherein said second mounting surface is integral with said appropriate support structure (28, 72).

5. The engine mount of claim 2 wherein said first and second damping means is made of elastomeric material.

6. The engine mount of claim 2 wherein said damping separation distance 'h' decreases by an amount equal to from 0.001 to 0.005 inches.

7. The engine mount of claim 1 wherein said thrust bearing means is at least one ball bearing (24).

8. The engine mount of claim 1 wherein said thrust bearing bearing means is at least one tapered roller bearing (200).

* * * * *